United States Patent [19]

Murahashi

[11] Patent Number: 5,043,918

[45] Date of Patent: Aug. 27, 1991

[54] MULTIPLE BUS IMAGE CONTROLLER STRUCTURE FOR COLOR PAGE PRINTERS

[75] Inventor: Seishin Murahashi, Newbury Park, Calif.

[73] Assignee: Dataproducts Corporation, Woodland Hills, Calif.

[21] Appl. No.: 433,715

[22] Filed: Nov. 9, 1989

[51] Int. Cl.[5] .......................................... G06K 15/00
[52] U.S. Cl. .................................. 364/519; 364/900; 364/935.4
[58] Field of Search .............................. 364/518–521, 364/240 MS, 240.1 MS, 235 MS, 930 MS, 935.4 MS; 346/154

[56] References Cited

U.S. PATENT DOCUMENTS

4,122,520 10/1978 Adamchick et al. ............... 364/200

Primary Examiner—Arthur G. Evans
Attorney, Agent, or Firm—Spensley, Horn, Jubas & Lubitz

[57] ABSTRACT

A printer control system for controlling the transfer of image data to a printer marking engine, composed of: a main processing unit for controlling the operation of the system; an interface for receiving print data from an external device; a main bus connected between the main processing unit and the interface; a first data storage device for storing, in a first form, data representing an image to be printed; a second data storage device for storing data representing an image to be printed in a second form suitable for transmission to the marking engine; a data block moving device for controlling the transfer of data from the first data storage device to the second data storage device while the data is converted from the first form to the second form; a second bus structurally separate from the main bus and interconnecting the first data storage device, the second data storage device and the data block moving device; and a signal transmitting device connected between the main bus and the second bus for permitting the transfer of data therebetween.

7 Claims, 2 Drawing Sheets

FIG. 1

| F | E | D | C | B | A | 9 | 8 | 7 | 6 | 5 | 4 | 3 | 2 | 1 | 0 | |
|---|---|---|---|---|---|---|---|---|---|---|---|---|---|---|---|---|
| LOGIC CODE |||| LEFT MASK |||| RIGHT MASK |||| SHIFT CODE |||| BCW00 |
| IWR03 - IWR001 |||| IHR11 - IHR00 |||||||||||| BCW01 |
| IWR12 - IWR04 ||||||||| SAR23 - SAR17 ||||||| BCW02 |
| SAR16 - SAR01 |||||||||||||||| BCW03 |
| CYL. ||||||| CHN | DAR23 - DAR17 ||||||| BCW04 |
| DAR16 - DAR01 |||||||||||||||| BCW05 |
| ||||||||| OCR27 - OCR17 ||||||| BCW06 |
| OCR16 - OCR01 |||||||||||||||| BCW07 |
| SXL |||| SWR8 - SWR1 |||||||||||| BCW08 |
| DXL |||| DWR8 - DWR1 |||||||||||| BCW09 |
| ||||||||| VAR23 - VAR17 ||||||| BCW0A |
| VAR16 - VAR01 |||||||||||||||| BCW0B |
| D/S ||| TFR10 - 00 ||||||||||||| BCW0C |
| EOP | ETF || SLR13 - SLR00 |||||||||||||| BCW0D |
| ||||| LMR11 - LMR00 |||||||||||| BCW0E |
| ||||||| AUX ||| AUX V_CLK RATE |||| BCW0F |
| |||| CYL. SIZE |||| CYLINDER ADDRESS |||||||| BCW10 |
| MPM | STP | RST | HOC | IDV | ICH | IDC | IEP | BLR7 - BLR0 |||||||| BCW11 |
| MPT | CHM | BMB | VOB | D/V | EOC | BMC | EOP | VSN | VAR23 - VAR17 ||||||| BCW12 |
| IWR12 - IWR04 |||||||| ||||||||| BCW16 |

*FIG. 2*

MULTIPLE BUS IMAGE CONTROLLER STRUCTURE FOR COLOR PAGE PRINTERS

BACKGROUND OF THE INVENTION

The present invention relates to printers, and particularly to printer control circuitry which processes data received from a computer or other word processor into a form suitable for transmission to a marking engine.

It is known that the overall operating speed of a word processing system is limited by the system printer and there is, accordingly, a continuing demand for printers capable of operating at ever higher speeds. Moreover, as new applications software is developed, there is a continuing demand for printers having increased flexibility with respect to the types of images which they can produce.

The control systems for such printers are generally constructed on the basis of bus architecture in which a plurality of individual system devices, including memories, timers, CPUs, etc., are connected for transfer of signals via a system bus. This arrangement offers the advantage of enabling any pair of devices to communicate with one another under software control. Since only one group of signals at a time can be conducted over a bus, special control devices, known as arbiters, are provided to resolve priority of simultaneous requests to access the bus by multiple bus masters.

While systems have been developed which enable the bus to be employed in a highly efficient manner, the fact that a bus can conduct only one set of signals at a time places an inherent upper limit on the operating speed of such a control system. The effect of the upper limit becomes more pronounced as improvements are produced in the operating speed of the printer marking engine, or print engine, which is the most critical moving part of the printer.

SUMMARY OF THE INVENTION

It is an object of the present invention to increase the operating speed of a printer at a lower cost while maintaining the capability of printing a wide variety of images.

Another object of the invention is to permit image data to be derived simultaneously with the performance of other processes in a printer control system.

A more specific object of the invention is to process a large quantity of print data for delivery to a marking engine in a circuit region which is separate from the main processing unit of the control system.

The above and other objects are achieved, according to the invention, by the provision of a printer control system for controlling the transfer of image data to a printer marking engine, comprising:

a main processing unit for controlling the operation of the system;

interface means for receiving print data from an external device;

a main bus connected between the main processing unit and the interface means;

first data storage means for storing, in a first form, data representing an image to be printed;

second data storage means for storing data representing an image to be printed in a second form suitable for transmission to the marking engine;

data block moving means for controlling the transfer of data from the first data storage means to the second data storage means while the data is converted from the first form to the second form;

a second bus structurally separate from the main bus and interconnecting the first data storage means, the second data storage means and the data block moving means; and signal transmitting means connected between the main bus and the second bus for permitting the transfer of data therebetween.

In further accordance with the invention, the data block moving means is constructed and operated to receive successive groups of control words, each group serving to control transfer of a respective block of image data from the first data storage means to the second data storage means or to the marking engine without requiring direct control by the main processing unit.

DESCRIPTION OF THE PREFERRED EMBODIMENTS

The printing of a page of text involves the following basic operations:

1) Print data is received from a host system, i.e., a computer operating as a word processor, and this data is held in a buffer memory;

2) Printer command codes and data are processed, i.e., parsed, and object code is prepared for each print object, i.e., each character or elemental area of a graphics image;

3) The object code is processed to electronically compose, in an imaging memory, a representation of the image to be printed; and 4) The image data is outputted to a marking engine, or print engine.

Frequently, both the manufacturing cost saving and the operating speed of a printer can be enhanced by constructing the printer to perform all four tasks simultaneously. Normally, tasks 1) and 2) are performed under control of the microprocessor contained in a main processing unit, while there is a tendency to perform tasks 3) and 4) under control of a hardware assist. If use is made of a hardware assist having an autonomous capability, the overall performance of the printer will be limited not by the operating capabilities of individual parts, but by inherent limitations on access to the system bus or to a particular memory. When, for example, the main processing unit is processing input data, the hardware assist devices cannot operate until they can, in turn, gain access to the system bus.

According to one novel aspect of the present invention, an improved hardware assist device, referred to herein as the block mover, and at least one image memory are connected to a bus which is physically separate from the main bus. Printer output devices are also connected to this second bus. With such an arrangement, the main processing unit of the system can control the performance of tasks 1) and 2), while the block mover and its associated devices can simultaneously perform tasks 3) and 4).

The provision of this second bus allows the throughput to a printer to be nearly doubled in speed without increasing the basic system speed or expanding the size of the system bus. Thus, a marking engine having a higher speed can be supported. Moreover, for a given task, the system can operate at lower clock frequencies, resulting in a more reliable operation. Furthermore, the overall cost of the system can be lower since the operating speeds of the individual components need not be increased.

Figure 1:
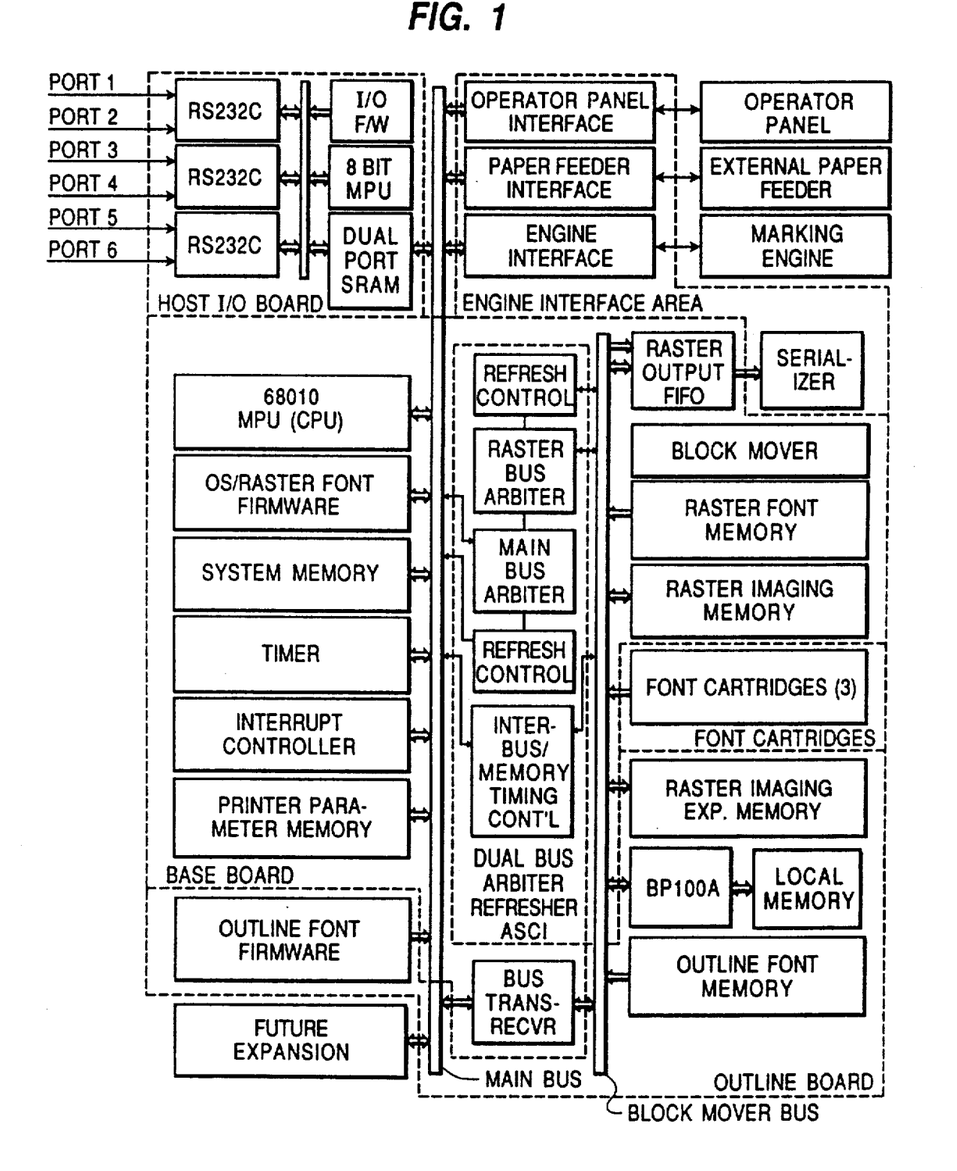
FIG. 1 is a block diagram of a preferred embodiment of a printer control system according to the present invention.

FIG. 1 is a block circuit diagram of a printer having a control system constructed according to the present invention.

The system shown in FIG. 1 includes a host I/O board containing three standard RS232C serial interfaces connected via a dedicated bus to a dual port SRAM and a small MPU which controls and orchestrates the interface activities by a program contained in I/O firmware storage, designated as I/O F/W.

The control system further includes a base board carrying the components illustrated, including a main bus. The main bus is additionally connected to an outline font firmware package and to connectors provided to allow future expansion.

According to the invention, the system includes a further bus, here identified as a block mover bus, directly connected to a block mover, a raster font memory, a raster imaging memory and one or more font cartridges. The block mover bus is additionally connected to a raster output FIFO register via which print data is delivered, through a serializer, to a marking engine, also known as a print engine.

The main bus and the block mover bus are coupled together by a dual bus arbiter refresher, including a DRAM refresh control, a raster bus arbiter, a main bus arbiter, a refresh control and an interbus-memory timing control. These components perform control functions particularly to assure that each bus is conducting only one set of signals at a time and to avoid conflicts when data is being transmitted between buses, this being effected via the bus transceiver. These devices would be constructed and operated according to principles known in the art.

There may additionally be connected to the block mover bus a raster imaging expansion memory, a local memory, connected via a BP100A, which is a device that converts vector format commands to image information, as well as an outline font memory, the latter devices and the outline font firmware being mounted on an outline board.

BP100A can create a wide variety of pictorial objects from a higher level of instruction. In a system according to the present invention, BP100A is used to generate a character glyph to a specified size and shape. The outline font memory contains the basic information to create a glyph, such as a letter, of a specified size, font style, aspect ratio, etc.

The actual printing operation and the feeding of paper are controlled by suitable components including an operator panel, an external paper feeder, and the marking engine, each of which is connected, via a respective interface, to the main bus. In addition, the marking engine is provided with a data input supplied from the serializer.

Control of the exchange of signals between the various devices, and control of each of the buses are performed according to principles well known in the art.

According to one significant novel feature of the present invention, the separate block mover bus interconnects particularly the raster output FIFO memory, the block mover, the raster font memory, the raster imaging memory and the font cartridges, the latter often being a read-only memory containing graphics images of a wide variety of commonly used glyph images, including but not limited to alphabets. With this structural arrangement, the processing of data into a form suitable for use by the marking engine, and the transfer of print data to the marking engine can be controlled by the block mover via the block mover bus. As a result, the main bus remains free for the MPU (or CPU) to accept new print data and commands, to process data, or to parse commands, and control other devices connected to it, including the block mover.

Thus, after data representing, for example, a string of text to be printed has been transmitted via the bus transceiver from, for example, the system memory to, for example, the raster font memory, the block mover takes over the function of placing that information in, for example, the raster imaging memory in a form required for transmission to the marking engine, while the main bus remains available for other operations.

The marking engine can be any known type of printing device such as a laser printer which produces one row of dots at a time on a sheet being printed, or a solid ink printer which prints a plurality of rows of dots during each scanning movement across the sheet being printed.

In accordance with the present invention, the block mover controls the movement of blocks of data between selected memories, under control of a group of block control words which are stored in the block mover for each data block. If several blocks of data are available, the block control words for each block may contain information, in the form of a single designated bit designated as the chaining bit, indicating that the block mover is to process a group of blocks in sequence, so long as each block of data to be processed is available in one of the memories of the system. The chaining bit can be introduced into each block control word group of the previous by the MPU based on the fact that the next block of data to be moved has been converted to the object code format.

Preferably, these operations are carried out on blocks of data contained in memories connected to the block mover bus, so that the main bus remains available to transmit other information. However, the block mover can be arranged to also act on information blocks contained in memories connected to the main bus.

Structurally, the block mover is composed of a set of registers, counters and gates arranged to enable the block mover to function substantially autonomously to access successive blocks of data and organize those blocks in a form suitable for further processing, the end result being the transmission of print data to the marking engine.

As will be described in greater detail below, four address registers constitute a central part of the block mover. These registers are designated herein as a Source Address Register (SAR), a Destination Address Register (DAR), an Object Code Address Register (OCR) and a Video Address Register (VAR). Each of these registers is selected to have a length of 23 bits. Structurally, the block mover is made up of 16-bit registers and each of the above-identified registers is, in fact, a functional register which is made up of portions of two of the structural registers. The data contained in each 16-bit structural register is identified herein as a Block Control Word. Therefore, to facilitate understanding, each structural register will be identified herein as a BCW and each functional register will be referred to as a register.

The SAR stores the address of that memory from which data is to be moved, the DAR stores the address of that memory to which that data is to be moved, the OCR stores the address of the memory containing the control words which are to be read into the block mover BCWs, and the VAR stores the address of the memory containing data which can be read out to the marking engine.

Applying these principles to the circuit shown in FIG. 1, the memory which is addressed by the content of the SAR may be the font memory, which includes the font cartridges and which is a ROM, an image memory which may be part of a DRAM or an SRAM and may be allocated to store source data such as a downloaded font or a company logo, etc., or the system memory. Use of the system memory represents a general purpose application of the block mover for the case where the system software may move non-image or image type data from one portion of the system memory to another. An example relating to non-image type data involves the relocation of down-loaded printer emulation codes from the buffer memory portion of the system memory to a final secure location within the system memory. In the case of image type data, a rasterized graphics image may be moved from the buffer memory portion of the system memory to a final location in the raster imaging memory if the image is to be used only once, or in a temporary location of the raster imaging memory if the image is to be repeatedly used, like a down-loaded logo, etc.

The memory addressed by the DAR must be capable of being written to, as well as being readable, and therefore must be a DRAM or an SRAM. This memory may be an image memory, such as the raster imaging memory, provided to compose the final image which is to be outputted to the marking engine, or the system memory, again for the case of a general purpose application of the block mover. The use of the system memory as the destination memory is described above.

The memory addressed by OCR may also be the system memory, an image memory or the font memory. For the system memory to store object code, the system MPU processes input data to generate object codes which are stored contiguously in portions of the system memory. The MPU loads the address of the next object code to be accessed in the OCR of the block mover.

The memory addressed by the VAR stores the current image data which is to be read out to the marking engine. In the circuit shown in FIG. 1, the address stored in the VAR would identify locations within the image memory, and specifically the raster imaging memory.

The object code address register (OCR) contains the address of a portion of the memory containing the object code the block mover is to act on. The object code address is incremented by 1 for every object code word accessed.

Figure 2:
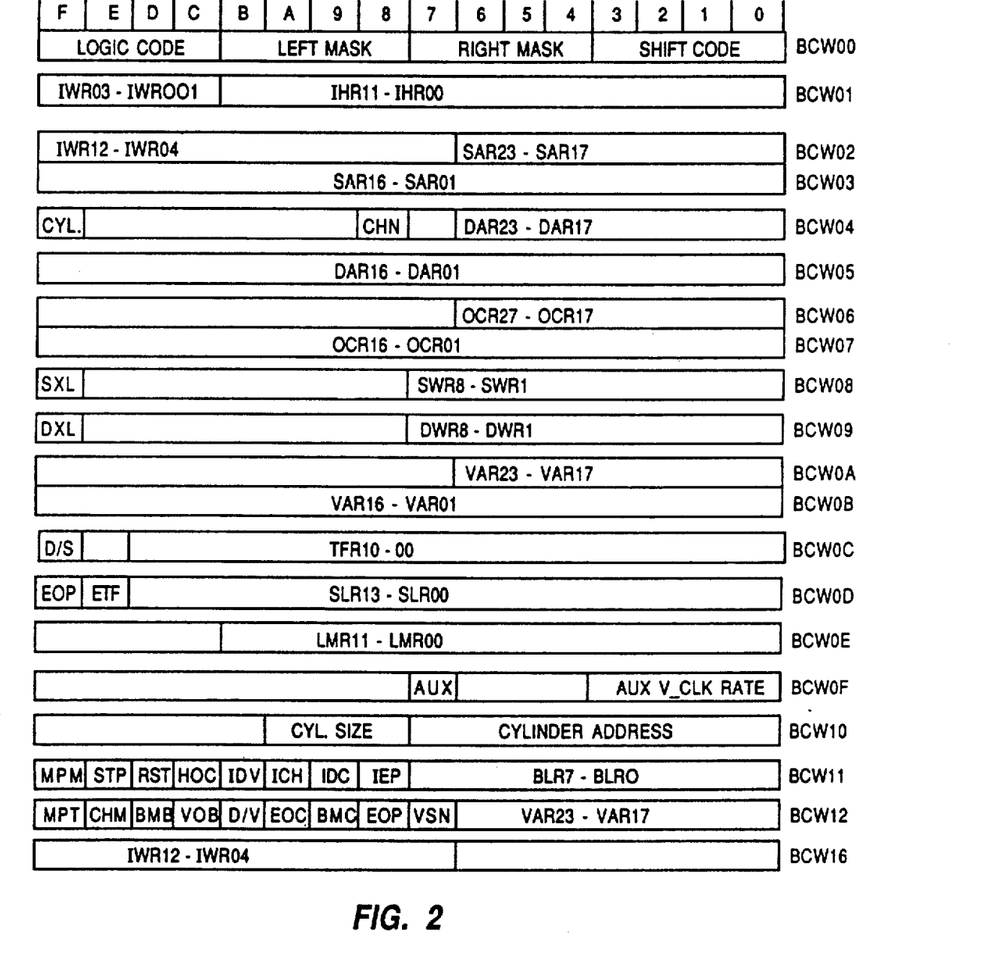
FIG. 2 is a representation of the physical register structure of the block mover of FIG. 1.

FIG. 2 shows the physical structure of the block mover registers, or BCWs, each of which is designated as corresponding to an associated block mover control word. On the other hand, various portions of one or more BCWs are designated "registers". These are functional registers whose functions are suggested by their names. Hereinafter, each physical register will be referred to as a "BCW" and each functional register will be designated by initials indicating its function and ending with "R".

BCW 00-05 contain object code designating a print object. A print object is a single image unit to be printed, for example an alphanumeric character or a rectangular unit area of a graphic image. The object code in BCW 00-05 contains necessary information for a block move operation.

As will be explained in greater detail below, the block mover controls movement of image data from the font cartridge or other source memory to the raster imaging memory or other destination memory and movement of print data from the raster imaging memory or other memory to the marking engine, which includes a print head.

In a typical process, data identifying each image unit is supplied from a connected computer via the host I/O board to the system memory and, under control of the MPU, is processed to produce object code. This object code is stored in the respective block mover's registers and then, the block mover proceeds with the data moving operation. Typically, if a print character is to be printed, font image stored in the font cartridge is read by the block mover and moved to the destination location, e.g., the raster imaging memory.

The block mover further acts to move print data for each print head scan from the raster imaging memory to the marking engine. The form of this print data depends on the characteristics of the marking engine, and particularly the number of dot rows which it can print during each print head scan. Typically, this number will be between one row and 16 rows and print data is supplied to the marking engine in serial form.

The primary function of the block mover is to move a rectangular image region autonomously from a source location, or address, e.g., the font cartridge, to a destination location, e.g., the raster imaging memory. It has the capability of fetching object codes from addressed locations, with optional chaining. This allows a virtually interrupt free, autonomous image dispatching for, e.g., an entire printed page. The block mover performs a video raster image output operation, to the marking engine, with virtually no assistance from the MPU.

The block mover is set up by loading control data to some or all of the 19 BCWs, many of which are simply counters and others of which are true registers. The counters are set up or down to a new value, or count, after each operation while the true registers retain their contents until they are actively rewritten.

Several of the BCWs contain several functional registers on a part of a relatively wide functional register to reduce the total number of bus operations required to set up the block mover.

BCW 00-05 contain the data for one print object. BCWs 06 and 07 together constitute the object code address register (OCR) containing the address of the first of a group of locations in the memory containing the object code, which will typically be the system memory. In an operating cycle, the address contained in BCWs 06 and 07 determines the locations in the memory storing object code from which BCWs 00-05 will be loaded. These registers could in special situations be loaded directly from the MPU.

The significance of the bits in BCW 00-05 is identified in FIG. 2. When the chaining bit in BCW 04 (bit 8) is set, e.g., to logic 1, the word in the OCR (BCWs 06 and 07) is increased by one and, therefore, the next block is transferred from the object code memory to BCW 00-05. The chaining bit is set, for each print object, under control of the MPU.

BCW 00:

The logic code identifies any bit-by-bit logic operations to be performed between the source and destination image data. This includes writing the source data to the destination, reading the destination data and writing it back to the destination (no change to the destination data), performing a logical OR, AND, XOR (exclusive OR) or XNOR (exclusive NOR) operation between the source and the destination data, or writing logic 1 or 0 to the destination word, irrespective of source data.

The left and right masks identify those bit locations in the destination memory which are not to be subjected to the designated logic operation. The bits at the masked locations are left unchanged. Each mask can extend over a maximum of 16 bit locations, starting from the respective boundary of the destination image region, or box.

The shift code determines the amount by which the source image data is shifted to the right when transferred to the destination image memory. When the source data is shifted to the right by the specified amount, those bits vacated to the left of the source data are automatically replaced with logical zeros.

BCW 01:

The four least significant bits of the Image Width Register (IWR) specify a fraction of the image width which is less than one data word, to be described below.

The Image Height Register (IHR) stores the height of the source data image box, or data rectangle to be moved, in terms of number of rasters, or print head scanning passes to produce the image box. For example, if the print head associated with the marking engine prints one row of dots at a time, e.g., has a single nozzle, and the marking engine has a vertical resolution of 300 dots per inch (DPI), then IHR, with a word length of 12 bits, can designate a maximum image height that would cover a page length of 13.64". IHR must be loaded for each image move operation.

BCW 02, 03:

The nine most significant bits of IWR identify the width of the image rectangle to be moved in terms of number of data words, each word consisting of 16 bits representing a character or graphics image unit area. The block mover determines from the contents of IWR3-0 whether to perform an extra read-modified-write operation to the destination memory if the minimum bounding box is shifted out to the next word. The minimum bounding box is the smallest rectangle which circumscribe the image data. Usually glyph data is stored in the font memory such that the minimum bounding box is flush to the left and any remainder on the right side is prefilled with zeros.

The maximum width of an image rectangle that can be moved at a time for a marking engine having a horizontal resolution of 300 DPI is 512 words, or 27.3".

The Source Address Register (SAR) receives and stores the address of the top left corner of the source image rectangle in a source memory, which may be a font cartridge, or the raster font memory, or some other memory in the system. The source image is always word aligned. Placement of the source image at the desired bit aligned location in the destination memory is accomplished by proper setting of the Destination Address Register (DAR), to be described below, and the shift code.

The contents of SAR are changed by each block move operation. Therefore, SAR must be reloaded after each such operation. SAR can be read or written to by accessing BCWs 02 and 03. IWR cannot be read from BCW 02.

BCW 04, 05:

Bit 8 of BCW 04 is the chaining bit which indicates whether a chaining operation is to be performed by the block mover. If this bit has a selected value, e.g., "1", this indicates that the next object code is available at the next, or contiguous, object code memory address location, which is 1 plus the address in the object code memory from which the content of BCW 05 was last obtained. The chain bit cannot be read by accessing BCW 04.

Bit F of BCW 04 is set to indicate whether cylinder addressing is to be employed for image dispatching.

The Destination Address Register (DAR) contains the word boundary destination address at which the top left corner of a source image rectangle is to be placed in a destination memory, which may be the raster imaging memory or any other desired destination. Bit boundary alignment is determined by the shift code in BCW 00. The content of DAR is changed by each block move operation. Therefore, this register must be reloaded for each such operation. The block mover recognizes writing to BCW 05 as completion of the block move object code loading.

The object code which is stored in BCW 00-BCW 05 is selected to be constituted by a small quantity of data, thereby reducing the amount of memory required to store the object code for each block move operation.

BCW 06, 07:

These have been described briefly above. They constitute the Object Code Address Register (OCR) which contains the address of the first one of a group of object code words which are to then be read into BCW 00 to 05.

BCW 08:

This contains a source memory addressing mode bit (SXL) and further constitutes a source memory width register (SWR). The value of bit SXL determines whether the source memory is to be addressed in the X/Y coordinate addressing mode or in the linear addressing mode. SWR contains a value representing the width of the source image memory when the X/Y coordinate addressing mode is being employed. If linear addressing is in effect, the content of SWR is meaningless. If SWR contains all zeros, and X/Y coordinate addressing is in effect, data is fetched repeatedly from the same source address for a block move operation.

BCW 09:

This contains a destination memory addressing mode bit DXL and further constitutes a Destination Memory Width Register (DWR). The value of bit DXL determines the destination memory addressing mode, as described above with respect to BCW 08. DWR contains data representing the width of the destination memory, usually equal to the width of the paper to be printed upon by the marking engine. A smaller width may be set, for example if the printed page is to have significant margins.

The contents of BCW 08 and 09 remain unchanged after each block move operation and can be changed by writing directly thereto.

BCW OA-OF:

The contents of these BCWs control the video outputting process, which is the process by which image data is transferred to the marking engine in a sequence of one printing scan line at a time. In the system according to the invention, the block mover associated with the separate block mover bus achieves a high level of interaction with the marking engine, freeing the MPU to perform other tasks. For printing, the host system is essentially called upon only to control the page level set-up.

BCW OA, OB:

These BCWs constitute the Video Address Register (VAR) which contains the address of the top left corner of the current page image, which may be, for example, in the raster imaging memory. The rasterized data will be output, one print line at a time, to the raster output FIFO starting from the address in VAR. For each printing line, or raster line, the number of data words transferred is determined by the content of DWR in BCW 09.

VAR must be reloaded after printing each page, or the data for the next page will be read from the last video address plus 1. The current contents of VAR can be read from BCW OB and BCW 12, to be described below.

Addressing of the image memory in the video data output mode is always linear.

BCW OC:

This BCW contains a video data output bit D/S whose value indicates whether the printing operation is to be simplex or duplex, and further constitutes a Top of Form Register (TFR) whose content indicates the number of printing scan lines to be skipped, while sheet feed continues, before resuming delivery of image data. After a vertical sync signal, VSYNC, is received the content of TFR is read. TFR is a down counter which must be loaded by the MPU at the beginning of each page. TFR must be loaded before the Scan Line Register (SLR), to be described below, because TFR also functions as a scan Line Counter.

TFR is decremented by 1 in response to each horizontal sync signal (HSYNC) received after VSYNC. Until TFR reaches zero, a VIDEO_EN signal is maintained high, disabling transmission of video, i.e., print, data.

BCW OD:

This BCW includes an End of Page (EOP) bit and an End of Top of Form (ETF) bit, as well as the SLR. EOP and ETF constitute flags which indicate that the identified condition exists. SLR stores data representing the number of lines, or rasters, to be scanned for printing one page. After TFR counts down to zero following appearance of a VSYNC, the content of SLR is transferred to TFR, so that TFR can then act as the Scan Line Counter, and VIDEO_EN is set low to allow transmission of print data to the marking engine. Thereafter, the content of TFR is decremented by 1 as data for each printer scanning line is transmitted to the marking engine. When TFR reaches a count of zero, VIDEO_EN is again set high to disable printing and an interrupt may be generated, if enabled, to set a flag bit in a status register in BCW 12, to be described below.

The content of SLR can be read by the MPU by accessing BCW OD. The MPU can also read EOP and ETF bits.

BCW OE

This BCW constitutes a Left Margin Register (LMR) whose content indicates the time of transmission to the marking engine of the leftmost data for the page currently being printed, in terms of a number of video clock pulses.

The content of LMR is loaded to a Left Margin Down Counter (LMC) (not shown) at the beginning of each print head scan, in response to an HSYNC pulse. LMC is decremented by the video clock VCLK and when its count is non-zero, printing is disabled. Upon reaching a count of zero, DWR is activated and its content is loaded into a further Scan Width Down Counter (SWC) (not shown) which is then decremented by VCLK, during which time printing is performed.

The content of LMR takes into account the paper size and the left margin position of the page image. LMR can be used to set a hard left margin instead of a soft left margin.

The block mover may additionally include a BCW (not shown) constituting a Scan Width Register (SWR) which is loaded with the same data as DWR of BCW 09. This data thus determines the number of image words, each word consisting of 16 bits, transmitted for each horizontal scanning movement of the marking engine. When, subsequent to receipt of a HSYNC, LMC counts down to zero, VIDEO_EN+ is produced to enable printing and the contents of SWR are loaded to SWC which is then decremented by VCLK. When SWC reaches a count of zero, printing is disabled. When this occurs, the next of row of video roster data is read out of the source memory, e.g., the raster imaging memory, to the raster output FIFO. To control this operation, SWC is reloaded with the contents of SWR and then down counted to assure that the correct number of data bits are transmitted to the FIFO.

BCW OF:

The circuitry associated with certain marking engines produce VCLK only for a period of time corresponding to the scanning of the width of a page being printed. Depending on the content of SWR, or DWR, and LMR, and further depending on the nature of the marking engine, the number of pulses of VCLK received by the block mover may be insufficient. BCW OF constitutes an auxiliary video clock rate register whose content indicates the amount of time required to time out before the internal clock of the printer is used to flush out the remaining data of the current scanning raster when an insufficient number of VCLK pulses is received during each HSYNC. The generation of auxiliary clock pulses under control of the auxiliary video clock rate register is determined by the setting of an AUX bit in BCW OF.

The value set in the auxiliary video clock rate register should equal Int (video clock./block mover clock.)+1.

BCW 10-12 constitute operation control registers whose contents should be changed only when the block mover is in an idle state.

BCW 10:

This BCW contains a Cylinder Size Register and a Cylinder Memory Address Register. When the content of the Cylinder Size Register has a non-zero value, cylindrical memory addressing is in effect and destination and video memory addressing are performed with higher order address bits replaced by the contents of a cylinder memory, starting from the address location indicated by the Cylinder Memory Address Register. For this purpose, reading of the cylinder memory always starts at an address which is a whole number multiple of the size of the cylinder memory. The Cylinder Memory Address Register contains the seven most significant address bits of the cylinder memory.

When cylindrical memory addressing is to be implemented, indicated by the value of bit F in BCW 04, a portion of the raster imaging memory is used as the cylinder memory.

When the allocated raster imaging memory is smaller than that required to cover a full printed page, then the relatively small imaging memory must be used repeatedly. Operation of the raster imaging memory, or a selected portion of it, as a cylinder memory involves addressing the memory, or memory portion, in a manner such that it functions as if wrapped into a cylindrical form and thus forms, in essence, a continuous, or endless, memory field.

This is in contrast to the commonly used "band buffer" image memory approach in which a partial page memory is split into a number of equal bands, usually two. While images already prepared on one band are outputted to the marking engine, the next image is stored in the second, or next, band. When an image to be generated is higher than the width of a band, or the image is positioned in the memory such that it extends across two adjacent bands, significant additional computation time is required and the image must be processed twice.

The cylindrical memory addressing approach significantly reduces the incidence of such image splitting.

For cylindrical addressing, some or all of the address bits of the Cylinder Memory Address Register are used as the higher order bits of the memory address. These bits thus define the location of the cylinder memory within the addressable memory field, defined by all memories available for image processing. Typically, the Cylinder Memory Address Bits used start from the highest order bit of the Cylinder Address (bit 7 of BCW 10) and proceed to the right by a number of bits determined by the Cylinder Memory Size, the larger the size, the smaller the number of bits.

The remainder of the memory address are derived from corresponding lower order bits in the Destination Address Register or the Video Address Register.

By way of example, it may be that if the cylinder memory size is 128K bits, and the memory address consists of 21 active bits, the five higher order bits would be bits 7-3 of BCW 10 and the remaining lower order bits would be derived from DAR 01-16 or VAR 01-16. For a cylinder memory size of 256K bits, the memory address would consist of bits 7-4 of BCW 10 and DAR 01-17 or VAR 01-17.

When the cylinder memory address is used, DAR and VAR are maintained normally with address carry into higher order bits. Since the MPU can set and read these address registers, this allows virtual memory addressing while a small cylinder memory is reused cyclically.

When the Cylinder Distance Register has a content of zero, cylinder addressing is not effected. In this case, the raster imaging memory is assumed to be planar or noncylindrical and memory is addressed on the basis of the contents of DAR and VAR.

Cylindrical addressing does not effect access to object codes or source images, allowing unobstructed access to the full word address field for these operations.

The numerical value contained in the Cylinder Size Register indicates the significant address bits which are masked by the cylinder address and indirectly indicates the size of the cylinder memory. The nonzero values which can be contained in the three bits of the Cylinder Distance Register can designate seven different cylinder memory sizes.

The block mover further includes circuits which are connected to compare the content of DAR with the content of VAR within the cylinder address field. When the current content of DAR plus one is found to be equal to the next value to be placed in VAR, an interrupt will be generated, when this interrupt has previously been enabled. This informs the host system that the current image dispatching process has progressed to the point that new data is encroaching on previously imaged data which is yet to be outputted to the print engine. Upon reading of the above-identified address registers, the host MPU can collect necessary address data in order to continue with the interrupted image data dispatching at a later time, and can go on with other image dispatching. This arrangement provides an efficient image composition capability with the smallest possible cylinder memory.

BCW 11:

This BCW constitutes a Burst Length Register (BLR) which determines the number of uninterrupted memory cycles that the block mover can occupy for each access to the bus. If the content of BLR has a zero value, the block mover is caused to retain bus control until the existing task is completed. When the task is completed, the block mover relinquishes the bus. even if unused bus cycles remain. BLR is decremented by one for each pair of memory operations completed by the block mover, the pair of operations consisting of one reading of the source memory, and one read-modified-write operation of the destination memory.

BCW further includes a multiple print code control bit MPM which can be set to cause the block mover to effect a read-modify-write "zero" to the raster imaging memory as each raster of the video data is transferred to the marking engine, thereby avoiding white printing of the raster imaging memory after printing of each page, or to cause the block mover to effect a read-modify-restore operation to the raster imaging memory. The latter setting allows multiple page printing of the same image. For this purpose, the MPU functions to insure that the raster imaging memory allocated for this operation has a size sufficient to store a full page. To terminate multiple page printing, the MPU sets MPM to a suitable value before completion of printing of the last copy.

A stop block move (STP) bit can be set to allow termination of the current block move operation at the end of the current scanning line. This bit can be set when the block mover relinquishes the raster bus as BLR counts out. If the block move operation is to be continued at a later time, the host MPU must read all pertinent registers and store them in its own memory. The contents of the pertinent registers, when read by the MPU, are already advanced to the next state, where appropriate. When the block move operation can be resumed, the MPU must reload all BCWs with the retrieved register contents. The other setting of STP causes the block move operation to continue in a normal manner.

A software reset (RST) bit can be set to a value which immediately causes termination of current activity, if any, resetting of all status flags to their non-busy state, and clearing of all outstanding interrupts and corresponding flag bits.

The HDC Data Output Mode (HDC) bit can be set to facilitate special data output operations required by solid ink printers. When this bit has one value, the block mover operates normally to serve a marking engine such as a laser printer which prints one row of dots at a time. When HDC is set to its other value, the block mover is controlled to transfer rectangular blocks of data for a marking engine having a plurality of nozzles, as is typical for solid ink printers. To facilitate this, a part of the circuit for the block move operation and a part of the circuit for the video output operation are used. Thus, each imaged word is subject to a read-modify-write zero operation for the rectangular image block to DAR and the video output control signals are outputted without activating the VAR to the address drivers. DAR is set to the start address of the image block to be moved.

To facilitate an asynchronous transfer to HDC, the signal into the HSYNC input pin is interpreted in a specific manner. Thus, when the HDC bit is set to designate a solid ink printer, the block mover checks for a "Data Acknowledge" assertion on a DTACK- line and for the HDC DTACK- assertion via the HSYNC pin before it undertakes to "modify" part of the cycle. Thus, before effecting a block move of imaged data to the memory of a head data controller of a solid ink printer, the following must be performed:

BCW 11—set the HDC bit to the appropriate value.
BCW 01—set IHR to the height of the block and set IWR0-3 to zero.
BCW 02—set IWR 12-4 to the width of the image and ignore the content of SAR.
BCW 04, 05—set DAR to the top-left corner address of the image block to be moved to the head data controller and disable the chain bit.

Upon setting of BCW 05, the block mover will start image transfer to the head data controller by performing read-modified-write operations to a DRAM starting with the address stored in DAR. The memory operation is in reality a read-modified-write 0. The block mover then produces a special signal compatible with the head data controller at a FIFO_WT pin.

BCW 11 further includes four interrupt enable bits which enable various interrupts when the block mover encounters one or more of the following events.

When the block mover has transferred the last video raster out, as determined by the counting down to zero of the scan line counter, an interrupt is generated if an end-of-page (IEP) bit has been set to a given value.

The setting of a dispatch complete (IDC) bit will cause an interrupt to be generated when the block mover has completed an image transfer operation. When the chained dispatch mode is in effect, the block mover will not access chained object codes until IDC is cleared upon reading of the status register (BCW 12) to be described below.

An end of chaining (ICH) bit can be set such that the block mover will generate an interrupt when its object code fetching mode is changed from the chain mode to the non-chain mode.

A destination = video address (IDV) bit can be set so that when the current destination address plus 1 is found to be equal to the next video memory address, an interrupt will be generated.

BCW 12:

This BCW provides indications of the status of the block mover and additionally constitutes a duplicate of the higher order bit locations of VAR. BCW 12 is a read-only register and upon the end of a reading operation, any outstanding interrupts are reset and the corresponding flag bits are cleared. Reading of the higher order bits of VAR is effected via BCW 12 because BCW 0A is not readable.

The remainder of BCW 12 contains block mover status flags. These include a VSYNC received (VSN) bit which indicates that the block mover has received a VSYNC signal from the marking engine. This bit is reset upon completion of video data transmission, when the scan line counter is counted down to zero.

The bits designated EOP, BMC, EOC and D/V constitute interrupt status flags which indicate the cause of an interrupt. Each of these bits is set to a selected value when the corresponding event takes place, irrespective of the data value in the respective locations of BCW 11. These bits are cleared by reading the status register or by effecting a reset. These bits represent, respectively: end of page; block move complete; end of chaining; destination = video address.

The remaining bits constitute block mover status flags. Thus, the bit VOB is set when the block mover is in the video output mode and is reset upon completion of this operation for each scanning line. The bit BMB is set to indicate that the block mover has begun a block move operation. This bit is reset upon completion of each block move operation.

The bit CHM is set when the block mover recognizes the setting of the chain bit in BCW 04. The block mover resets CHM when the chain bit is not set. The bit MPT is set when the block mover is instructed to enter the multiple print mode if the bit MPM of BCW 11 has not been set. Upon completion of printing of a page, the block mover resets MPT.

The system according to the present invention further includes a five-bit BCW address register which is used to address BCW 00-12. Certain address lines associated with a chip select signal will be stored to the BCW address register, which in turn directs the addressing data to the addressed BCW register.

What is claimed is:

1. A printer control system for controlling the transfer of image data to a printer marking engine, comprising:

a main processing unit for controlling the operation of said system;
interface means for receiving print data from an external device;
a main bus connected between said main processing unit and said interface means;
first data storage means for storing, in a first form, data representing an image to be printed;
second data storage means for storing data representing an image to be printed in a second form suitable for transmission to the marking engine;
data block moving means for controlling the transfer of data from said first data storage means to said second data storage means while the data is converted from the first form to the second form;
a second bus structurally separate from said main bus and interconnecting said first data storage means, said second data storage means and said data block moving means; and
signal transmitting means connected between said main bus and said second bus for permitting the transfer of data therebetween.

2. A system as defined in claim 1 further comprising object code storage means connected to one of said buses, controllable by said main processing unit and containing a plurality of addressable locations for storing instructions for controlling the operation of said data block moving means.

3. A system as defined in claim 2 wherein each of said data storage means has a plurality of addressable locations in which the respective data is stored, and the instructions stored in said object code storage means include at least one block of instructions containing the address of a first location of said first data storage means at which the data representing an image is stored and the address of a first location of said second data storage means at which the data representing an image is stored, and said main processing unit is operable for transferring a block of instructions from said object code storage means to said data block moving means.

4. A system as defined in claim 3 wherein the instructions stored in said object code storage means include a plurality of such blocks of instructions and each block of instructions includes a chaining instruction indicating whether a further block of instructions should be automatically transferred to said data block moving means after processing of a previously transferred block of instructions.

5. A system as defined in claim 4 wherein each block of instructions consists of a selected number of binary words, and said data block moving means comprise a plurality of first storage registers each having a bit length sufficient to store, and each connected to receive, a respective binary word of an instruction block.

6. A system as defined in claim 5 wherein said object code storage means store the binary words of each block of instructions at locations having contiguous addresses and the addresses of one block of instructions are contiguous to the addresses of a second block of instructions, and said data block moving means comprise at least one further storage register for storing the address of a selected location of said object code storage means, said at least one further register being readable for effecting transfer of a binary word from the location of said object code storage means having the address stored in said at least one further storage register to a respective one of said first storage registers.

7. A system as defined in claim 6 wherein said at least one further storage register of said data block moving means is operable to have its contents changed by a bit value of one after each transfer of a binary word from said object code storage means to a respective one of said first registers.

* * * * *